United States Patent
Lau et al.

(10) Patent No.: US 6,460,806 B2
(45) Date of Patent: Oct. 8, 2002

(54) AIRCRAFT PASSENGER CABIN WINDOW WITH VISUALLY ENLARGED APPEARANCE

(75) Inventors: Michael Lau, Dollern; Sven Schaich, Neu Wulmstorf, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 10 days.

(21) Appl. No.: 09/749,299

(22) Filed: Dec. 26, 2000

(65) Prior Publication Data

US 2001/0015398 A1 Aug. 23, 2001

(30) Foreign Application Priority Data

Dec. 23, 1999 (DE) .......................................... 199 62 489

(51) Int. Cl.$^7$ ................................................ B64C 1/14
(52) U.S. Cl. .................................................. 244/129.3
(58) Field of Search ........................... 244/129.3, 129.1; 52/202, 213, 208, 171.1, 786.1, 786.13

(56) References Cited

U.S. PATENT DOCUMENTS

| | | | | |
|---|---|---|---|---|
| 3,906,669 A | * | 9/1975 | Vorguitch | 244/129.3 |
| 4,364,533 A | * | 12/1982 | Pompei et al. | 244/129.3 |
| 4,541,595 A | * | 9/1985 | Fiala et al. | 244/129.3 |
| 5,397,080 A | * | 3/1995 | Berg | 160/1 |
| 6,082,674 A | * | 7/2000 | White et al. | 244/129.3 |
| 6,168,112 B1 | * | 1/2001 | Mueller et al. | 244/129.3 |
| 6,227,491 B1 | * | 5/2001 | Stephan et al. | 244/129.3 |

FOREIGN PATENT DOCUMENTS

| | | |
|---|---|---|
| DE | 23321 | 11/1962 |
| DE | 1252533 | 10/1967 |

* cited by examiner

Primary Examiner—Peter M. Poon
Assistant Examiner—Kevin Jakel
(74) Attorney, Agent, or Firm—W. F. Fasse; W. G. Fasse

(57) ABSTRACT

A passenger cabin window, especially in a commercial passenger transport aircraft, includes an outer window pane and an inner window pane with an interspace formed therebetween, and a frame around the perimeter of the window interspace. The frame has a funnel-like shape that expands or enlarges from the smaller dimensions of the outerpane to the larger dimensions of the inner pane. At least a visible portion of the frame bounding the window interspace is provided with a mirror reflective surface and particularly a reflective coating thereon. The reflective surface reflects the outside scene, so that the window frame with the reflective surface appears to be a part of the outside view, to a passenger looking out of the window. This visually enlarges the window opening and visually reduces the structural thickness of the fuselage wall, thereby avoiding a closed-in feeling and a tunnel-vision-effect through the window funnel.

12 Claims, 2 Drawing Sheets

AIRCRAFT PASSENGER CABIN WINDOW WITH VISUALLY ENLARGED APPEARANCE

PRIORITY CLAIM

This application is based on and claims the priority under 35 U.S.C. §119 of German Patent Application 199 62 489.5, filed on Dec. 23, 2000, the entire disclosure of which is incorporated herein by reference.

FIELD OF THE INVENTION

The invention relates to a passenger cabin window, especially in a commercial transport aircraft, whereby the cabin window essentially comprises an outer window pane and an inner window pane with an interspace formed therebetween, and a frame arranged around the perimeter of the interspace.

BACKGROUND INFORMATION

The fuselage of conventional commercial transport aircraft, at least in the areas enclosing a passenger cabin therein, are typically provided with cabin windows to provide a view for the passengers and help avoid a closed-in or claustrophobic feeling. These windows must be embodied in a pressure-tight manner due to the pressurized environment maintained within the aircraft fuselage, and the resulting pressure difference between the interior and the exterior of the fuselage during the flight at high altitudes. In order to achieve a pressure-tight and sufficiently strong window construction, the lateral dimensions thereof are limited. Moreover, in order to minimize the weakening of the fuselage structure that results from forming holes through the fuselage to install the windows, it is typical to use a plurality of relatively small individual exterior windows.

The above described conventional cabin windows are, for example, disclosed in the German Patent Publications DE-AS 1,252,533 and DD 23 321. These windows comprise an outer window pane and an inner window pane, with a window interspace formed therebetween, and a frame arranged around the perimeter of the interspace. This frame is typically referred to as a "window funnel" because it expands or flares in the manner of a funnel, from the relatively smaller dimensions of the outer window pane to the relatively larger surface area dimensions of the inner window pane.

The inner window pane is effectively a part of the finish components of the passenger cabin, while the outer window pane is arranged substantially flush with the exterior of the fuselage skin. Thus, the spacing distance between the outer pane and the inner pane is substantially prescribed by the structural depth or thickness of the fuselage wall between the fuselage outer skin and the interior cabin paneling of the passenger cabin. In some aircraft with a rather large structural depth or thickness of the fuselage structure, and particularly in high capacity or wide bodied aircraft, the "window funnel" expands quite significantly between the outer pane and the inner pane. The resulting significant "funnel effect" can make the outside window opening appear extremely small when viewed by a passenger from the interior of the cabin, which can cause a closed-in or claustrophobic feeling in the passengers. In passengers suffering from claustrophobia, this funnel-effect or tunnel-vision-effect can trigger anxiety, fear and panic.

SUMMARY OF THE INVENTION

In view of the above, it is an object of the invention to improve a cabin window arrangement, so as to reduce or avoid the closed-in or funnel-effect or tunnel-vision-effect despite the relatively small window size of the outer window pane and a relatively large structural depth of the fuselage wall of the window funnel arranged therein. It is a further object of the invention to visually hide or obscure the true depth or thickness of the fuselage wall in which the window is arranged and the true dimensional relationships of the window, and to provide a visually enlarged appearance of the outer window surface area and a visually reduced thickness of the fuselage wall when viewed from the interior of the cabin, thereby providing an open and unconfined impression. The invention further aims to avoid or overcome the disadvantages of the prior art, and to achieve additional advantages, as apparent from the present specification.

The above objects have been achieved according to the invention in a passenger cabin window comprising an outer window-pane and an inner window pane with a window interspace formed therebetween, and a frame arranged around the perimeter of the interspace, wherein a reflective surface is provided on at least a visible portion of the frame at the perimeter of the window interspace. The reflective surface can be provided by a chrome layer or a metal foil layer applied or deposited onto the window frame. The reflective surface is preferably a specular or mirror reflective surface.

The inventive arrangement advantageously provides the optical or visual impression that the surface area of the window opening, and particularly the outer window opening, is larger than it truly is. Similarly the inventive window advantageously hides or obscures the true structural depth of the fuselage wall. In this manner, an enclosing or tunnel-vision effect on the passengers in the passenger cabin can be avoided or reduced. This optical illusion of an enlarged window and thinner fuselage wall is especially effective during flight, because the random and variform visual image of the sky and clouds and the like is reflected in the reflective surface of the window frame, without providing visual cues to the passenger that he or she is seeing a reflection rather than a direct line-of-sight image. Namely, it is difficult to distinguish the transition between the actual image and the reflected image of a random and changing pattern such as a view of clouds and the sky. In comparison, on the ground, where the passenger's field of view includes distinct visual reference points, it is more difficult to "trick" the view of the passenger into believing that the reflection is an actual line-of-sight image if close attention is paid. Nonetheless, to the casual observer who looks out of the window according to the invention, an enlarged visual appearance of the exterior window opening will be provided both on the ground and during flight.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
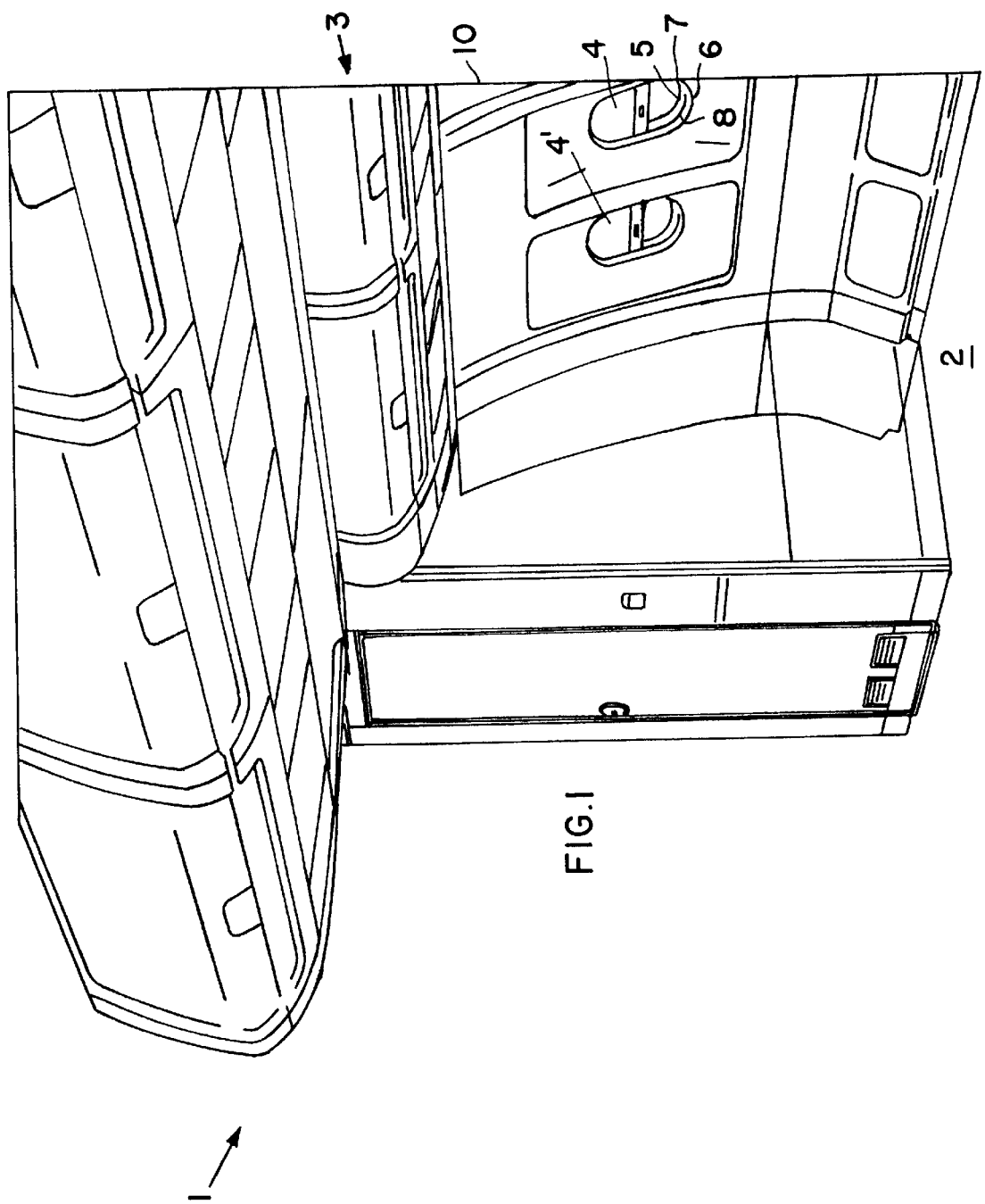
FIG. 1 is a perspective view of a portion of an aircraft passenger cabin including cabin windows according to the invention.

FIG. 1 shows a portion of a passenger cabin 1 of a commercial passenger aircraft in a perspective view. This portion of the passenger cabin 1 encloses a cabin space or cabin room 2 in which seating rows (not shown) may be arranged in any conventional manner. Baggage compartments 3 are arranged above the seats to provide a space for the passengers to store their carry-on luggage or the like. Cabin-windows 4 and 4' are provided in the wall 10 of the fuselage enclosing the passenger cabin 1. Typically, the cabin windows 4 and 4' are arranged in the aircraft fuselage so that a respective cabin window 4 or 4' is allocated to a single row of seats, of course depending on the particular row spacing provided in a given cabin layout.

Figure 2:
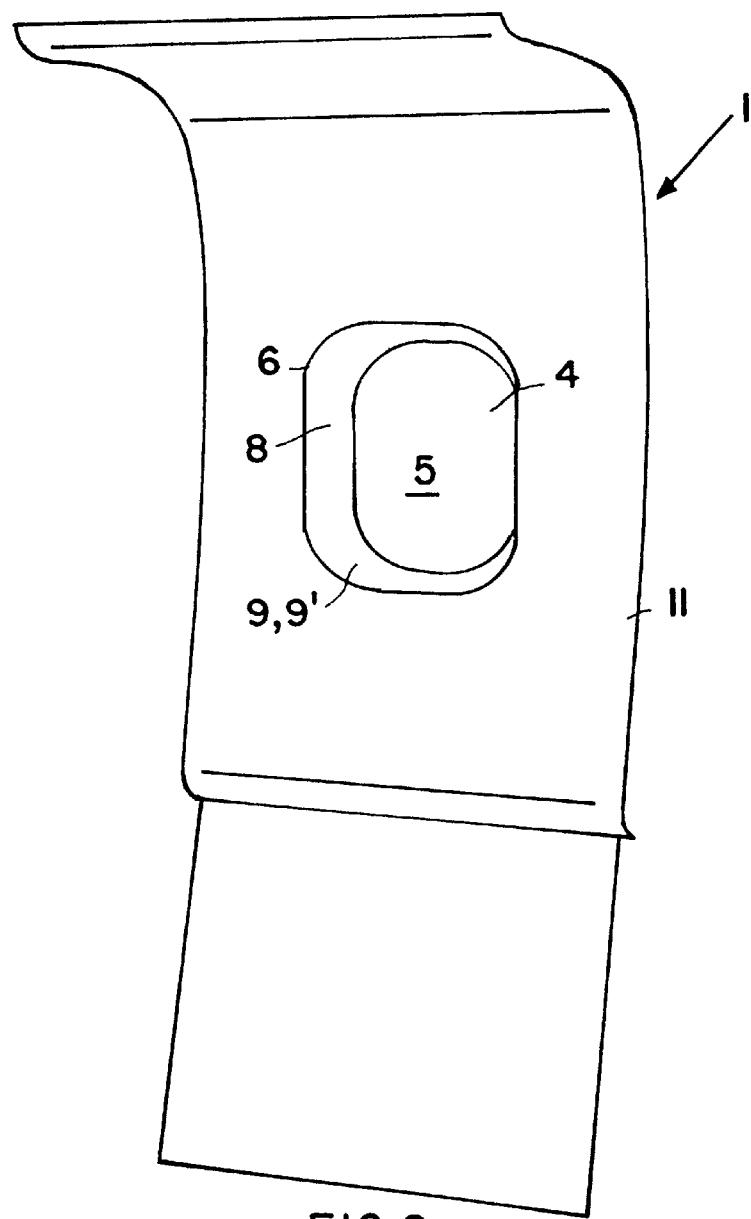
FIG. 2 is a schematic perspective view of a section of cabin interior paneling and a cabin window according to the invention as seen from the interior of the cabin.
Figure 3:
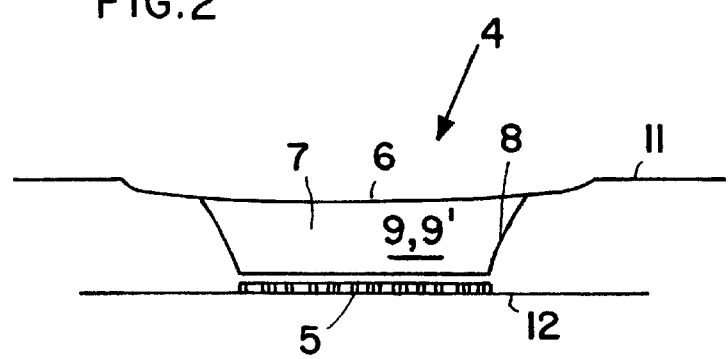
FIG. 3 is a cross-section through the aircraft fuselage having a cabin window according to the invention installed therein.

Each cabin window 4, 4' respectively comprises an outer window pane 5 and an inner window pane 6, with a window interspace 7 formed therebetween. A frame 8 is arranged around the perimeter of the window interspace 7, whereby this frame 8 is typically referred to as a "window funnel" since it expands or flairs in the manner of a funnel from the smaller area dimensions of the outer window pane 5 to the perimeter of the inner window pane 6, which has a relatively larger surface area than the outer pane 5. The frame 8 may include a structural frame member, a trim component such as a trim "funnel" covering the frame member, seal members providing a seal relative to the window panes, and the like, according to any conventional cabin window construction. In order to describe the details of the present inventive window construction, FIG. 2 shows a single cabin window 4 seen in a portion or section of the cabin interior paneling 11, and particularly as seen from the interior of the cabin 1. FIG. 3 shows a cross-section through the cabin window 4. The inner window pane 6 is substantially an interior finish component of the passenger cabin 1 and thus is flush with or smoothly transitions to the interior cabin paneling 11, while the outer window pane is substantially flush with the outer skin 12 of the fuselage. Thus, the spacing distance between the outer pane 5 and the inner pane 6 is substantially determined by the structural depth between the fuselage outer skin 12 and the interior cabin paneling 11 of the passenger cabin 1.

In order to visually minimize or obscure this actual structural depth of the fuselage wall, and in order to visually enlarge the rather small actual window opening size of the outer window pane 5, the invention provides that at least a visible surface area or portion of the frame 8 has a mirror reflective surface 9, which may particularly be provided by a reflective coating 9'. Preferably, the entire inwardly facing surface of the frame 8 in the interspace 7 between the outer pane 5 and the inner pane 6 is uniformly provided with the reflective surface 9 or coating 9'. Alternatively, only a respective portion or portions of the frame may be provided with the reflective surface, at the areas which most effectively provide the optical illusion of enlarging the visual size of the window opening. This will depend on the particular shape of the various components, and the position of the window relative to the expected or typical point of view of the passenger. For example, if the typical passenger's line-of sight passes somewhat downwardly through the window when looking out the cabin 1, it may not be necessary and may not provide an additional benefit to form the reflective coating 9' on the upper inwardly facing surface of the frame 8.

The mirror reflective coating 9' can, for example, be a chrome layer applied onto the structural member or the trim component of the frame 8, or a vapor deposited layer of reflective material, or an applied layer of a mirror reflective film or foil. Any known method and any known reflective materials for providing a reflective surface on a component can be used to form the reflective surface 9 according to the invention. The structural component of the frame 8 as well as any other components of the frame may respectively have any known construction of such a window frame, using any known material or materials, such as metal alloys, plastics, composites, etc.

The mirror-reflective surface 9 or particularly the reflective coating 9' will reflect the image of the exterior-environment, which will provide the visual impression that at least the reflective portion of the frame 8 still belongs to the exterior environment rather than being a physical structural component of the aircraft. This will provide, for the passenger who looks out the window, the impression of an enlarged window opening and a reduced structural depth or thickness of the fuselage wall. Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A passenger cabin window comprising an outer window pane, an inner window pane spaced apart from said outer window pane with an interspace formed therebetween, and a frame arranged at a perimeter of said interspace, wherein said frame has a frame surface and at least a portion of said frame surface that is visible through said inner window pane is a mirror-finished specular reflective surface.

2. The passenger cabin window according to claim 1, wherein said frame comprises a frame member and a reflective layer on said frame member, wherein said reflective layer provides said reflective surface.

3. The passenger cabin window according to claim 2, wherein said reflective layer is a chrome layer.

4. The passenger cabin window according to claim 2, wherein said reflective layer is a metal foil layer.

5. The passenger cabin window according to claim 2, wherein said reflective layer is a vapor-deposited layer of a reflective material.

6. The passenger cabin window according to claim 1, wherein said frame surface faces and bounds said interspace entirely around a perimeter thereof, and the entire area of said frame surface that bounds said interspace and is visible through said inner window pane comprises said reflective surface.

7. The passenger cabin window according to claim 1, wherein said inner window pane has relatively larger area dimensions and said outer window pane has relatively smaller area dimensions, and wherein said frame has a tapering funnel shape that tapers from said relatively larger area dimensions of said inner window pane to said relatively smaller area dimensions of said outer window pane.

8. The passenger cabin window according to claim 7, wherein said reflective surface provides a visual effect of making said outer window pane appear to be larger than said relatively smaller area dimensions when observed through said inner window pane.

9. The passenger cabin window according to claim 1, wherein said reflective surface provides a visual effect of making said outer window pane appear to be larger than true area dimensions of said outer window pane when observed through said inner window pane.

10. The passenger cabin window according to claim 1, wherein said frame surface bounds and surrounds the entirety of said perimeter of said interspace, and said reflective surface extends over the entirety of said frame surface.

11. In an aircraft including a fuselage enclosing a passenger cabin therein, and a cabin window arranged in said fuselage, wherein said window includes an outer pane, an inner pane spaced apart from said outer pane with an interspace formed therebetween, and a frame arranged around a perimeter of said interspace wherein said frame has a frame surface bounding said interspace, an improvement comprising a mirror-reflecting layer on at least a portion of said frame surface.

12. The improvement in the aircraft according to claim 11, wherein said mirror-reflecting layer is arranged on the entirety of said frame surface bounding said interspace.

* * * * *